United States Patent
Nagaoka et al.

(10) Patent No.: US 8,561,396 B2
(45) Date of Patent: Oct. 22, 2013

(54) EXHAUST GAS PURIFICATION APPARATUS

(75) Inventors: Daiji Nagaoka, Fujisawa (JP); Teruo Nakada, Fujisawa (JP); Akihide Oogushi, Fujisawa (JP); Hiroyuki Yuza, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 323 days.

(21) Appl. No.: 12/736,982

(22) PCT Filed: Jun. 5, 2009

(86) PCT No.: PCT/JP2009/060344
§ 371 (c)(1),
(2), (4) Date: Nov. 29, 2010

(87) PCT Pub. No.: WO2009/157292
PCT Pub. Date: Dec. 30, 2009

(65) Prior Publication Data
US 2011/0072806 A1    Mar. 31, 2011

(30) Foreign Application Priority Data
Jun. 25, 2008  (JP) .................................. 2008-166324

(51) Int. Cl.
*F01N 3/02*  (2006.01)
(52) U.S. Cl.
USPC ............... 60/320; 60/298; 60/297; 60/299; 60/301; 422/170; 422/173; 422/175; 422/178; 422/181
(58) Field of Classification Search
USPC ........... 60/274, 295, 297, 298, 299, 300, 301, 60/320; 422/169, 170, 171, 173, 175, 177, 422/178, 180, 181
See application file for complete search history.

(56) References Cited

U.S. PATENT DOCUMENTS 4,425,304 A * 1/1984 Kawata et al. ................ 422/171
5,173,267 A * 12/1992 Maus et al. .................... 422/179
(Continued)

FOREIGN PATENT DOCUMENTS

DE   202007010435 U1   11/2007
JP        48-33113        5/1973
(Continued)

OTHER PUBLICATIONS

Patent Abstracts of Japan, Publication No. 2006-348767, published Dec. 28, 2006.
Japanese Office Action in Application No. 2008-166324, issued Oct. 16, 2012.
(Continued)

*Primary Examiner* — Binh Q Tran
(74) *Attorney, Agent, or Firm* — Staas & Halsey LLP (57) ABSTRACT

An exhaust gas purification apparatus including a first exhaust gas treatment member carrying an oxidation catalyst, a three-way catalyst, or a NOx storage reduction catalyst which is used for purifying exhaust gas from an internal combustion engine, a second exhaust gas treatment member having a hydrocarbon ("HC") storing function disposed on the downstream side of the first exhaust gas treatment member, and a heat dissipating unit disposed between the first exhaust gas treatment member and the second exhaust gas treatment member. An upstream side of the heat dissipating unit is formed into a heat insulating structure, and a further upstream side thereof is formed into a heat retaining structure. Even when an internal combustion engine is accelerating, the exhaust gas flowing into the HC adsorption material can be cooled efficiently and HC can be adsorbed before the temperature of the three-way catalyst or the NOx purification catalyst rises to an HC light-off temperature.

7 Claims, 6 Drawing Sheets

(56) References Cited

U.S. PATENT DOCUMENTS

| | | | |
|---|---|---|---|
| 6,203,764 B1 * | 3/2001 | Benson | 422/179 |
| 7,010,910 B2 * | 3/2006 | Watanabe et al. | 60/300 |
| 7,921,640 B2 * | 4/2011 | Major | 60/320 |
| 8,075,843 B2 * | 12/2011 | Kumar | 422/177 |
| 8,226,897 B2 * | 7/2012 | Kunze et al. | 422/179 |
| 8,302,306 B2 * | 11/2012 | Hill et al. | 29/890 |
| 2006/0008397 A1 | 1/2006 | Bruck | |

FOREIGN PATENT DOCUMENTS

| | | |
|---|---|---|
| JP | 9-85078 | 3/1997 |
| JP | 11-210446 | 8/1999 |
| JP | 11-350950 | 12/1999 |
| JP | 2000-8841 | 1/2000 |
| JP | 2005-155404 | 6/2005 |
| JP | 2006-348767 | 12/2006 |
| JP | 2007-40149 | 2/2007 |
| WO | WO 03/025356 A1 | 3/2003 |
| WO | WO 2009/012819 | 1/2009 |

OTHER PUBLICATIONS

Patent Abstract of Japan, Publication No. 9-85078, Published Mar. 31, 1997.
Patent Abstract of Japan, Publication No. 11-210446, Published Aug. 3, 1999.
Patent Abstract of Japan, Publication No. 2000-8841, Published Jan. 11, 2000.
International Search Report dated Sep. 1, 2009 in PCT/JP2009/060344.
European Search Report issued Apr. 8, 2013 in corresponding European Patent Application No. 09770002.
Patent Abstract of Japan, Publication No. 2005-155404, Published Jun. 16, 2005.
Abstract only of WO 2009/012819 which is a family patent member of DE 20 2007 010435 U1.
Patent Abstracts of Japan, Publication No. 2007-40149, published Feb. 15, 2007.
Patent Abstracts of Japan, Publication No. 11-350950, published Dec. 21, 1999.

* cited by examiner

EXHAUST GAS PURIFICATION APPARATUS

CROSS-REFERENCE RELATED APPLICATION

This application claims the benefit under U.S.C. Section 371, of PCT International Application No. PCT/JP2009/060344, filed Jun. 5, 2009 and Japanese Application No. 2008-166324 filed Jun. 25, 2008, the contents of which are incorporated herein by reference.

TECHNICAL FIELD

The present invention relates to an exhaust gas purification apparatus including a catalyzer, such as a three-way catalyst and a NOx purification catalyst, the exhaust gas purification apparatus using a hydrocarbon ("HC") adsorption material, such as zeolite, and being capable of largely reducing an amount of HCs flowing out into the atmosphere by an arrangement of the catalyzer, the HC adsorption material, and a heat dissipating unit.

BACKGROUND ART

In regard to countermeasures taken against the outflow of HCs in a system for exhaust gas purification disposed in an internal combustion engine mounted in an automobile, a material having a microporous structure, such as zeolite, has been used, the material being known to have a peculiar characteristic of adsorbing HC species, ammonia, and the like having a large molecular diameter on micropores of the material. Such a material adsorbs HC species and the like at a temperature of 250° C. and below, but releases adsorbed HC species and the like at a higher temperature of 250° C. to 300° C. At a temperature of 300° C. and above, HC species and the like are oxidized by a catalyst supporting a precious metal, such as an oxidation catalyst ("DOC"), a three-way catalyst ("TWC"), a NOx storage reduction catalyst ("LNT"), and a NOx catalyst of the selective reduction type. The release of the HC species and the like is considered to be due to excitation of the molecules at a high temperature range.

In the case of a system for exhaust gas purification including this material as a HC adsorption material disposed in the system, the HC adsorption material ends up releasing HCs at a temperature of 250° C. and above. For this reason, if the temperature range of HC release is not set to overlap the HC light-off temperature ranges of the oxidation catalyst and the like, HCs flow out to the downstream side of these exhaust gas treatment devices, less purified exhaust gas results.

Especially, as a catalyst system which requires a countermeasure against the outflow of HCs, there are a three-way catalyst and a NOx storage reduction catalyst. In a system for exhaust gas purification employing a three-way catalyst, when the amount of fuel is increased during acceleration or the like, the air-fuel ratio becomes deeply rich; therefore, the amount of HCs flowing out increases. In the meantime, in a system for exhaust gas purification employing a NOx storage reduction catalyst, at the time of regenerating process for restoring the NOx storage capacity, it is necessary to achieve a rich atmosphere by supplying HCs or the like by post injection or by direction injection into an exhaust pipe. Accordingly, if the optimal control for the amount of NOx released from the NOx storage reduction catalyst is not performed, there arises a concern that the amount of HCs flowing out into the atmosphere may increase. Moreover, similarly to a three-way catalyst, such a concern becomes more critical during acceleration. In other words, the catalyst temperature of the NOx storage reduction catalyst rises with acceleration, and then stored NOx is released, thereby increasing occasions to perform NOx regeneration control to reduce the NOx thus released; thus, the amount of HCs flowing out is likely to increase.

As a preventive measure against the outflow of HCs, disposition of a HC adsorption material on the downstream side (subsequent stage) of a three-way catalyst or a NOx storage reduction catalyst is effective to some degree. However, the temperature range allowing HC adsorption of the HC adsorption material is a relatively low of 250° C. and below. Accordingly, when the temperature of the exhaust gas rapidly rises at such time as acceleration, there arises a problem that the effect is insignificant against the prevention of the HC outflow.

For this reason, in these systems for exhaust gas purification, as a countermeasure for the problem of the HCs flowing out during acceleration, a control for preventing an increase of the HCs flowing out at the expense of the NOx purification efficiency is carried out. For example, in the case of a three-way catalyst, the amount of fuel injection is suppressed so as to avoid leading to an excessively rich atmosphere. In the meantime, in the case of a NOx storage reduction catalyst, the air-fuel ratio rich control for the purpose of restoring the NOx storage capacity is stopped until the catalyst temperature rises and thereby the HC purification efficiency is improved.

On the other hand, as described in Japanese patent application Kokai publication No. hei 09-85078, for example, an apparatus for purifying the exhaust gas of engines is proposed as follows. In regard to the arrangement of a three-way catalyst and a HC adsorbing purification catalyst, the three-way catalyst is deposited in an upstream part of an exhaust system located inside of an engine compartment, while the HC adsorbing purification catalyst mainly including a HC adsorption agent, an oxygen supplying agent, and the like, is deposited in a downstream part of the exhaust system located in an underfloor part outside of the engine compartment. The three-way catalyst is activated in an early stage after the starting of the engine, and the HC adsorption agent is prevented from being heated up to the HC desorption temperature before this activation by use of wind received by a running vehicle for cooling.

Further, as described in Japanese patent application Kokai publication No. hei 11-210446, for example, an apparatus for exhaust purification in an internal combustion engine is proposed as follows. A lean NOx catalyst (NOx storage reduction catalyst) is arranged on the upstream side of a HC adsorption catalyst having a three-way catalyst layer deposited as an upper layer on a HC adsorption material. The temperature of the exhaust introduced into the HC adsorption catalyst is proactively decreased by disposing cooling fins located inside and outside of a pipe for cooling exhaust, a heat mass (heat capacity) made of a honeycomb structure located inside the pipe, and the like, between the lean NOx catalyst and the HC adsorption catalyst, and by cooling with a refrigerant, such as water, so as to reliably delay the HC adsorption material heated up to the desorption initiating temperature with respect to the activation of the lean NOx catalyst.

However, in the former, depending on the running speed, the temperature of the HC adsorbing agent catalyst deposited in the underfloor part varies; therefore, there arises a problem of difficulty in controlling the HC adsorption capacity. In the latter, since no NOx catalyst of the selective reduction type is provided on the downstream side, there is a problem that HCs desorbed from the HC adsorption material flows out. In addition, these three-way catalyst and HC adsorbing purification catalyst, and the lean NOx catalyst and HC adsorption catalyst, are independently formed and arranged away from each other. Accordingly, there is a problem that not only the system for exhaust gas purification becomes long but also installation of the system takes time as it has two parts of the device.

SUMMARY OF THE INVENTION

The present invention has been carried out in view of the circumstances described above, and objects thereof are to provide an exhaust gas purification apparatus employing a three-way catalyst or a NOx purification catalyst and a HC adsorption material, in which, even in an internal combustion engine operating state during acceleration, exhaust gas flowing into the HC adsorption material can be cooled efficiently, so that HCs can be adsorbed by the HC adsorption material, during the period until the temperature of the three-way catalyst or the NOx purification catalyst rises to the HC light-off temperature.

An exhaust gas purification apparatus achieving the above-described objects includes: a first exhaust gas treatment member supporting any one of an oxidation catalyst, a three-way catalyst, and a NOx storage reduction catalyst, which is used for purifying exhaust gas from an internal combustion engine; and a second exhaust gas treatment member having an HC storing function and being disposed on a downstream side of the first exhaust gas treatment member; and a heat dissipating unit disposed between the first exhaust gas treatment member and the second exhaust gas treatment member, the heat dissipating unit lowering the temperature of exhaust gas flowing into the second exhaust gas treatment member, wherein an upstream side of the heat dissipating unit is formed into a heat insulating structure, and a further upstream side thereof is formed into a heat retaining structure.

In this constitution, the side of the first exhaust gas treatment member is a heat retaining structure, and a heat insulating structure is provided between the first exhaust gas treatment member and the heat dissipating unit. Accordingly, an increase in the temperature difference between them can be facilitated and maintained. In other words, when the temperature of the exhaust gas rises at such times as acceleration, the heat dissipating unit cools the exhaust gas so as to lower the temperature of the exhaust gas flowing into the second exhaust gas treatment member having a HC adsorbing function located on the downstream side. In this way, during the period until the temperature of the first exhaust gas treatment member supporting any one of an oxidation catalyst, a three-way catalyst, and a NOx storage reduction catalyst rises to a high-temperature region above the HC light-off temperature, the temperature of the second exhaust gas treatment member can be kept in a low-temperature region.

Therefore, when the temperature of the second exhaust gas treatment member located on the downstream side rises to a temperature (for example, 250° C.) at which its HC adsorbing function is lost, the temperature of the first exhaust gas treatment member including any one of an oxidation catalyst, a three-way catalyst, and a NOx catalyst of reduction type, located on the upstream side has already reached to the activation temperature or above; therefore, a sufficient level of light-off HC activity can be expected. Thus, during the period before the first exhaust gas treatment member is activated, HCs can be reliably adsorbed by the second exhaust gas treatment member located on the downstream side.

As a result, at such times as acceleration, it is not necessary to carry out such control as carried out in the prior art, including control to prevent an excessively rich atmosphere by reducing fuel in the case of a three-way catalyst, and control to attempt to prevent HCs from flowing out into the atmosphere by stopping rich reduction or the like during the period until the catalyst temperature rises to improve the HC purification efficiency at the expense of the NOx purification efficiency. For this reason, a sufficient level of NOx reduction in NOx regeneration control for the purpose of restoring the NOx storage capacity can be carried out from the early stage of acceleration.

In the exhaust gas purification apparatus described above, the first exhaust gas treatment member and the second exhaust gas treatment member are respectively arranged on both sides of the heat dissipating unit in such a way to be parallel to each other with the heat dissipating unit as a bottom part so as to arrange a whole shape of the first exhaust gas treatment member, the heat dissipation unit, and the second exhaust gas treatment member in a U-letter shape. In this constitution, the heat dissipating unit having a large area can be provided on the bottom part, which is a bending portion of the U-letter shape. Accordingly, the exhaust gas purification apparatus can be made smaller, and a smaller number of processes are required for the attachment to a pipe.

Alternatively, in the exhaust gas purification apparatus described above, the first exhaust gas treatment member and the second exhaust gas treatment member are arranged in parallel to each other, and a winding connecting passage is provided therebetween so as to form a whole shape of the first exhaust gas treatment member, the connecting passage, and the second exhaust gas treatment member into a S-letter shape, and any one of a part and an whole of the connecting passage is formed as the heat dissipating unit. In this constitution, the head dissipating unit having a large area can be provided in a bending portion of the S-letter shape, and, further, diffusion of the flow can be achieved.

Alternatively, in the exhaust gas purification apparatus described above, the first exhaust gas treatment member and the second exhaust gas treatment member are arranged in any one of a T-letter shape and an L-letter shape, and a winding connecting passage is provided therebetween so as to form a whole shape of the first exhaust gas treatment member, the connecting passage, and the second exhaust gas treatment member into any one of a T-letter shape and an L-letter shape, and any one of a part and an whole of the connecting passage is formed as the heat dissipating unit. In this constitution, the head dissipating unit having a relatively large area can be provided in a bending portion of the any one of a T-letter shape and a L-letter shape. Accordingly, the exhaust gas purification apparatus can be made smaller, and a smaller number of processes are required for the attachment to a pipe.

In the exhaust gas purification apparatus according to the present invention, which includes a three-way catalyst or a NOx purification catalyst and an exhaust gas treatment member having a HC adsorbing function, even in an internal combustion engine operating state during acceleration, the exhaust gas flowing into the HC adsorption member can be cooled efficiently and HCs can be adsorbed by the HC adsorption material, during the period until the temperature of the three-way catalyst or the NOx purification catalyst rises to the HC light-off temperature; therefore, the HCs flowing out into the atmosphere can be prevented.

DESCRIPTION OF THE EMBODIMENTS

Figure 1:
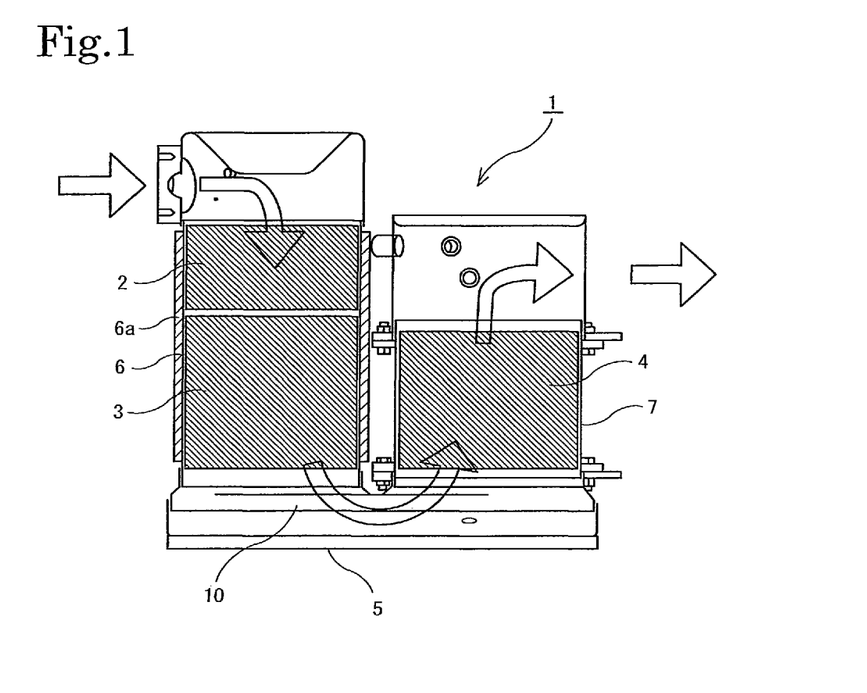
FIG. 1 is a lateral cross-sectional view showing a constitution of an exhaust gas purification apparatus of a first embodiment according to the present invention.

Hereinafter, an exhaust gas purification apparatus of embodiments according to the present invention will be described by referring to the drawings. FIG. 1 shows the constitution of an exhaust gas purification apparatus 1 of a first embodiment of the present invention. The exhaust gas purification apparatus 1 is an apparatus to be disposed in an exhaust passage of an engine (internal combustion engine). The apparatus 1 is formed by including from the upstream side thereof an oxidation catalyst 2, a three-way catalyst or a NOx storage reduction catalyst 3 which serves as a first exhaust gas treatment member, and a HC adsorption material 4 which serves as a second exhaust gas treatment member having a HC adsorbing function. Hereinafter, the case where a NOx storage reduction catalyst is used as the first exhaust gas treatment member is taken as an example for the description; however, the present invention is also applicable to the case of employing a three-way catalyst.

The oxidation catalyst 2 is formed in such a way that a porous ceramic honeycomb structure supports thereon an oxidation catalyst, such as platinum. The oxidation catalyst 2 has a role in purifying the exhaust gas by oxidizing HCs and CO in the exhaust gas, and a role in rising the temperature of the exhaust gas by oxidizing a part of HCs supplied as a reducing agent of NOx in NOx regeneration for the purpose of restoring the NOx storage capacity of the NOx storage reduction catalyst 3.

The NOx storage reduction catalyst 3 is formed in such a way as to support an alkaline metal or an alkaline earth metal together with a precious metal, and oxidizes NO in the exhaust gas containing excessive amount of oxygen to nitrate salt so as to adsorb it on the catalyst, thereby purifying NOx. The NOx storage reduction catalyst 3 stores NOx when the exhaust gas has a lean air-fuel ratio, but, in the case of a rich air-fuel ratio, releases stored NOx and, at the same time, reduces thus released NOx in a reducing atmosphere, thereby reducing the amount of NOx.

As the second exhaust gas treatment member 4, a HC adsorption material, which employs a ceramic support or a metal support having a porous material, such as zeolite-based and alumina-based, coated thereon, is used. This constitution is known to have a HC adsorbing function.

A heat dissipating unit 5 is formed in a connecting passage 10 connecting the first exhaust gas treatment member 3 and the second exhaust gas treatment member 4. The front of the outflow of the exhaust gas from the first exhaust gas treatment member 3 and the front of the inflow of the exhaust gas into the second exhaust gas treatment member 4 are formed on a heat dissipating surface 5a. Specifically, in a catalyst casting, which holds the first exhaust gas treatment member 3 and the second exhaust gas treatment member 4, as a bending layout, the oxidation catalyst 2 and the NOx storage reduction catalyst 3 are arranged in the front side of the bending portion, while the HC adsorption material 4 is arranged in the back side of the bending portion. By having this constitution, it is possible to dissipate heat from the heat dissipating surface 5a of the heat dissipating unit 5 located in the bending portion, and also to adjust the amount of temperature decrease of the second exhaust gas treatment member 4 by adjusting the amount of the area of the heat dissipating surface 5a. Further, the entire exhaust gas purification apparatus 1 becomes short in its whole length, thereby becoming compact.

Figure 2:
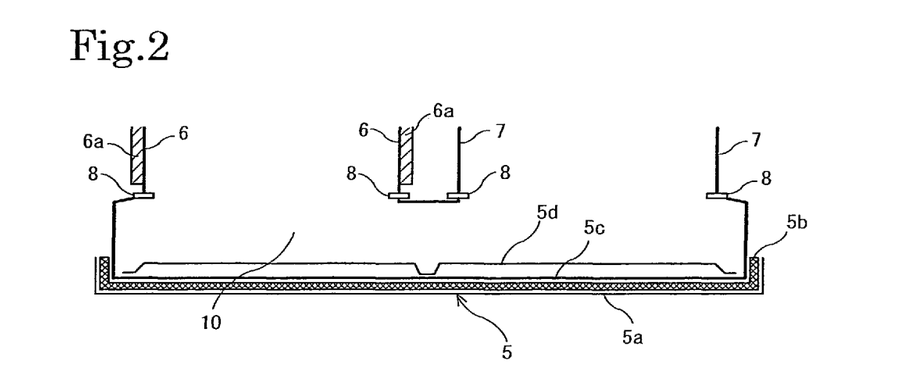
FIG. 2 is a partial lateral cross-sectional view showing a constitution of a heat dissipating unit 5.

As shown in FIG. 2, being formed with the heat dissipating surface 5a formed with a stainless steel ("SUS") material located at the outermost position, the heat dissipating unit 5 has a heat insulating layer (alumina layer) 5b having a thickness of approximately 10 mm made of aluminum oxide (alumina), a silicon carbide (silica), or the like, arranged at an inner side of the dissipating surface 5a, and a supporting member 5c holding the heat dissipating surface 5a and the heat insulating layer 5b. Further, at an inner side of the supporting member 5c, a baffle plate 5d is disposed as a floating structure. The SUS layer of the heat dissipating surface 5a is provided also for the purpose of holding the heat insulating layer 5b, and the heat insulating layer 5b prevents heat dissipation from the exhaust gas. The effect of heat dissipation can be adjusted by adjusting the thickness or the like of the SUS layer. Meanwhile, the baffle plate 5d prevents heat dissipation from the exhaust gas. Together with this, an air layer is provided between the supporting member 5c and the baffle plate 5d so as to acquire an effect of heat insulation with this air layer. Further, by adjusting the area or the like of the heat dissipation surface 5a, the structure of the heat dissipation unit 5 is formed into a heat dissipating structure in which the temperature of the exhaust gas can be lowered by approximately 20° C. to 30° C. while the exhaust gas is flowing from the position of the outflow from the first exhaust gas treatment member to the position of the inflow into the second exhaust gas treatment member 4.

At a connecting part between a first case 6 storing the first exhaust gas treatment member 3 and the heat dissipating unit 5 and a connecting part between a second case 7 storing the second exhaust gas treatment member 4 and the heat dissipating unit 5, a gasket wrapping a SUS 304 having a small thermal conductivity and low conductivity of electricity or a gasket wrapping a heat shield material, for example, a packing 8 formed with a material, such as ceramic fiber, is clamped so as to form a heat insulating structure. Further, the first case 6 storing the first exhaust gas treatment member 3 is surrounded by a heat retaining material 6a, such as glass wool and expandable plastic, so as to make the first case side into a heat retaining structure. By this, the upstream side of the second exhaust gas treatment member 4 is made into a heat insulating structure, and the further upstream side thereof is made into a heat retaining structure. In this way, the temperature difference between the first exhaust gas treatment member 3 and the second exhaust gas treatment member 4 is increased.

Figure 3:
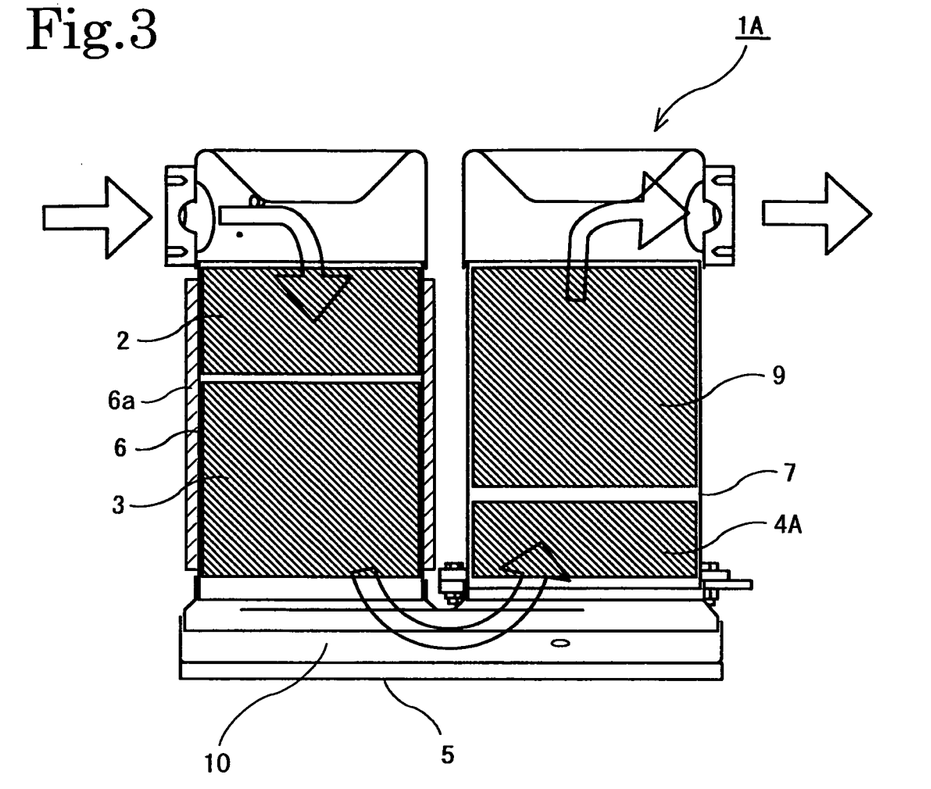
FIG. 3 is a lateral cross-sectional view showing a constitution of an exhaust gas purification apparatus of a second embodiment according to the present invention.

Next, a second embodiment will be described. An exhaust gas purification apparatus 1A of the second embodiment as shown in FIG. 3 employs a NOx catalyst 4A of the selective reduction type (SCR catalyst) as the second exhaust gas purification member. The NOx catalyst 4A of the selective reduction type is formed in such a way that a support having a honeycomb structure or the like made of cordierite, aluminum oxide, titanium oxide, or the like supports titania-vanadium, β-type zeolite, chrome oxide, manganese oxide, molybdenum oxide, titanium oxide, tungsten oxide, or the like. In this constitution, ammonia is adsorbed, and thus adsorbed ammonia is used for reduction purification of NOx. The NOx catalyst 4A of the selective reduction type as well as the HC adsorption material 4 has a HC adsorbing function. It should be noted that, in the case where the NOx catalyst 4A of the selective reduction type is used for purification of NOx, a device supplying urea or the like which is converted into ammonia to the upstream side is provided.

Further, a catalyst-supported DPF 9 is disposed on the downstream side of the NOx catalyst 4A of the selective reduction type. This catalyst-supported DPF 9 is formed with a wall-flow type filter of a monolith honeycomb structure, which is obtained by alternatively sealing inlets and outlets of channels of porous ceramic honeycomb, or the like. This filter part supports a catalyst, such as platinum and cerium oxide. With this catalyst-supported DPF 9, PM (particulate particle) in the exhaust gas is trapped by the porous ceramic wall.

This exhaust gas purification apparatus 1A of the second embodiment is as well formed into a U-letter shape similar to that of the exhaust gas purification apparatus 1 of the first embodiment, thereby being capable of exerting an equivalent effect.

Figure 4:
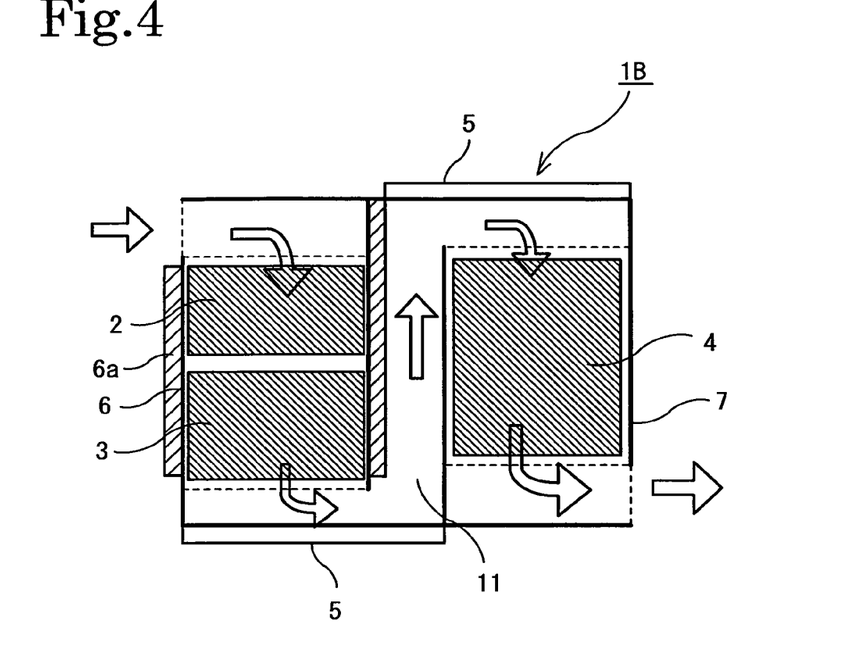
FIG. 4 is a schematic view showing arrangement of a first exhaust gas treatment member and a second exhaust gas treatment member in an exhaust gas purification apparatus of a third embodiment according to the present invention.

Next, a third embodiment will be described. As shown in FIG. 4, in an exhaust gas purification apparatus 1B of the third embodiment, a first exhaust gas treatment member 3 and a second exhaust gas treatment member 4 are arranged in parallel to each other, and a winding connecting passage 11 is provided therebetween so that the whole shape of the first exhaust gas treatment member 3, the connecting passage 11, and the second exhaust gas treatment member 4 is formed into an S-letter shape. In addition to this, a part or the whole of the connecting passage 11 is formed as a heat dissipating unit 5.

According to this exhaust gas purification apparatus 1B of the third embodiment, the heat dissipating unit 5 having a large area can be provided in a bending portion of the S-letter shape, compared to the exhaust gas purification apparatuses 1 and 1A of the first and second embodiments. Further, the flow of the exhaust gas can be sufficiently diffused.

Figure 5:
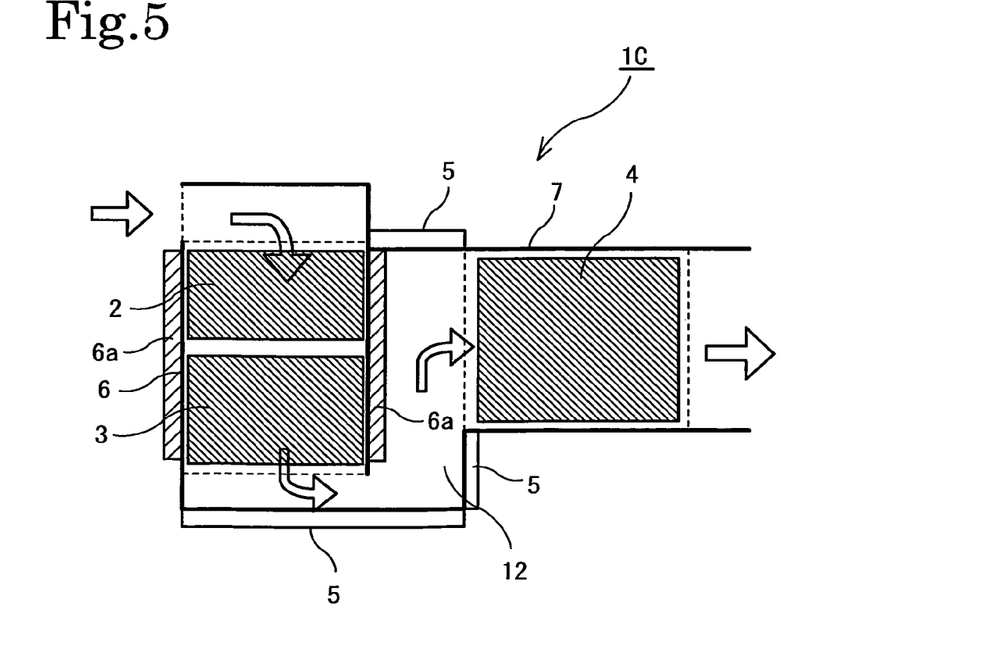
FIG. 5 is a schematic view showing arrangement of a first exhaust gas treatment member and a second exhaust gas treatment member in an exhaust gas purification apparatus of a fourth embodiment according to the present invention.

Next, a fourth embodiment will be described. As shown in FIG. 5, in an exhaust gas purification apparatus 1C of the fourth embodiment, a first exhaust gas treatment member 3 and a second exhaust gas treatment member 4 are arranged in a T-letter shape or an L-letter shape, and a winding connecting passage 12 is provided therebetween so as to form the whole shape of the first exhaust gas treatment member 3, the connecting passage 12, and the second exhaust gas treatment member 4 into a T-letter shape or an L-letter shape. In addition to this, a part or the whole of the connecting passage 12 is formed as a heat dissipating unit 5.

According to the exhaust gas purification apparatus 1C of the fourth embodiment, the heat dissipating unit 5 having a relatively large area can be provided at a bending portion of the T-letter shape or the L-letter shape. Accordingly, the exhaust gas purification apparatus 1C can be made smaller, and fewer steps are required for attachment to a pipe. The area of the heat dissipating unit 5 in this exhaust gas purification apparatus 1C of the fourth embodiment can be between those of the exhaust gas purification apparatuses 1 and 1A of the first and second embodiments and that of the exhaust gas purification apparatus 1B of the third embodiment.

Figure 6:
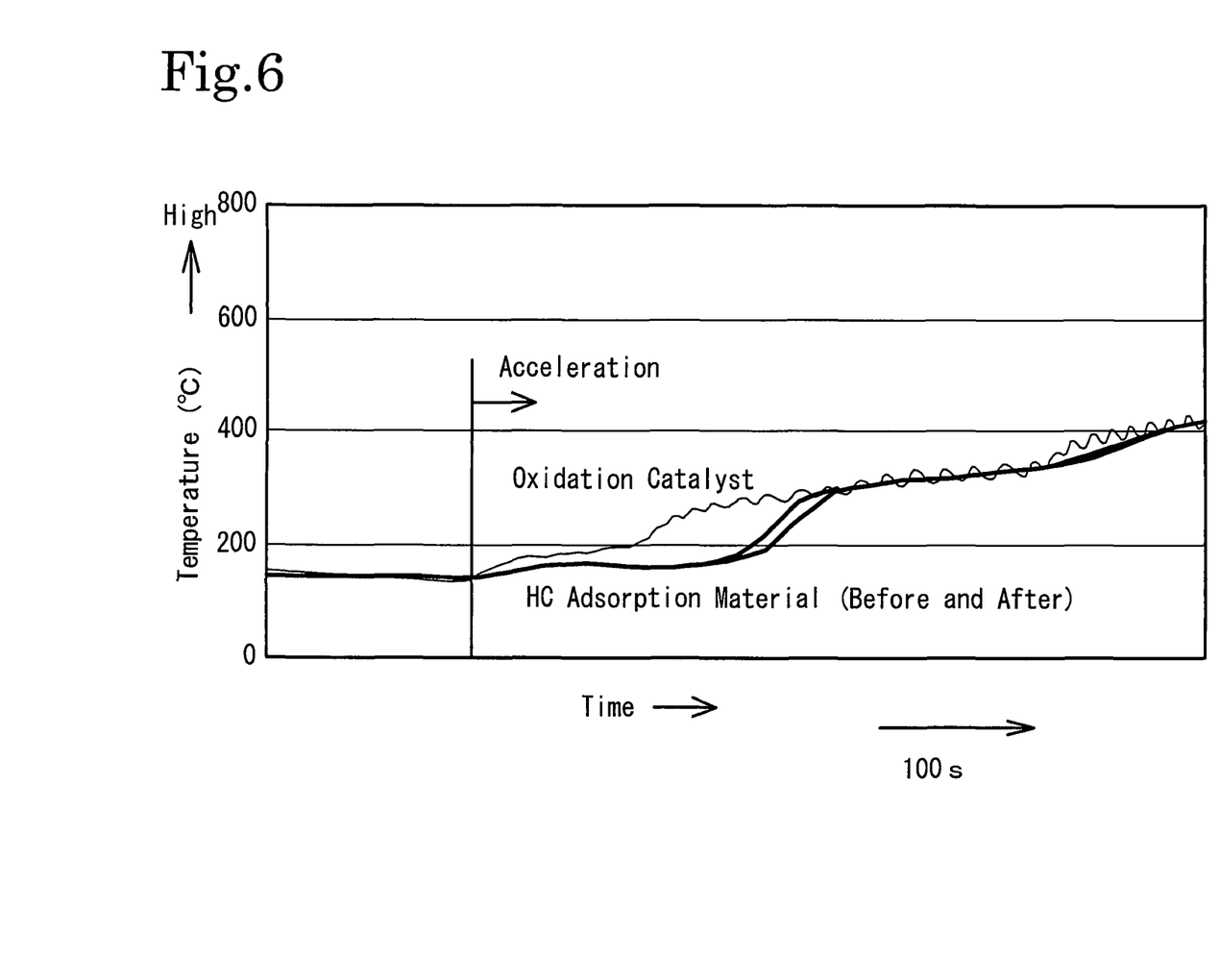
FIG. 6 is a view showing chronological changes in the temperatures of an oxidation catalyst and a HC adsorption material during acceleration in Example.
Figure 7:
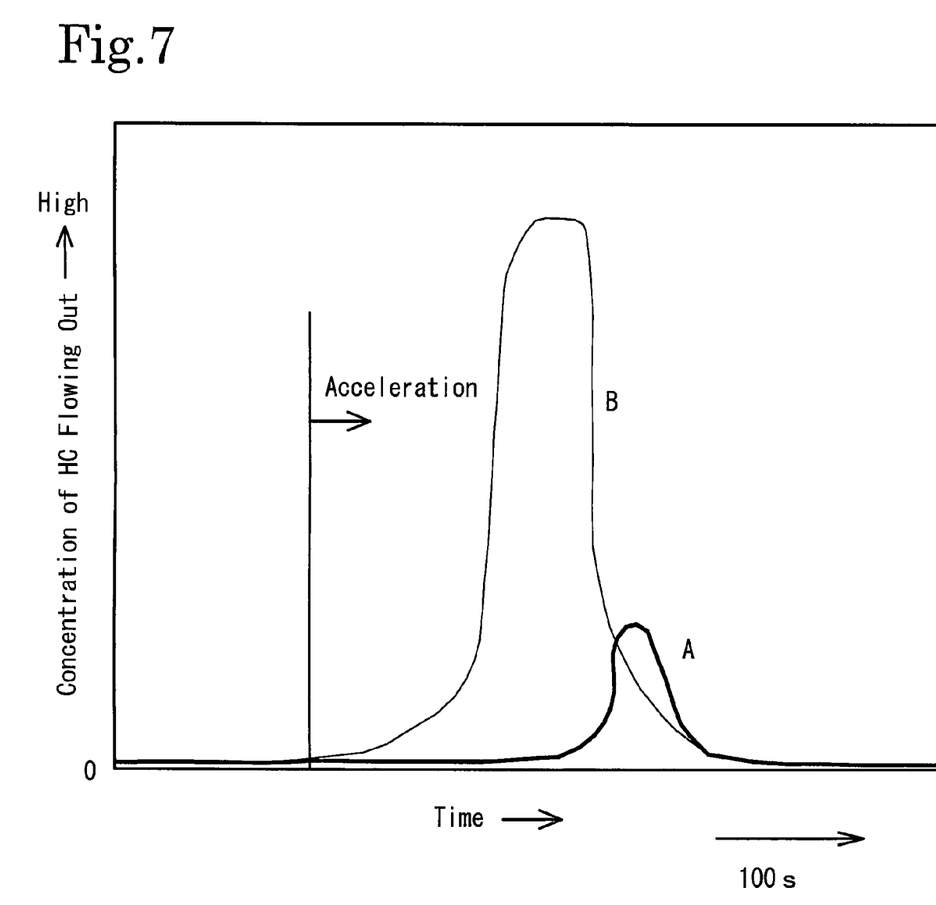
FIG. 7 is a view showing concentrations of the HC flowing out in an Example and a Conventional Example.
Figure 8:
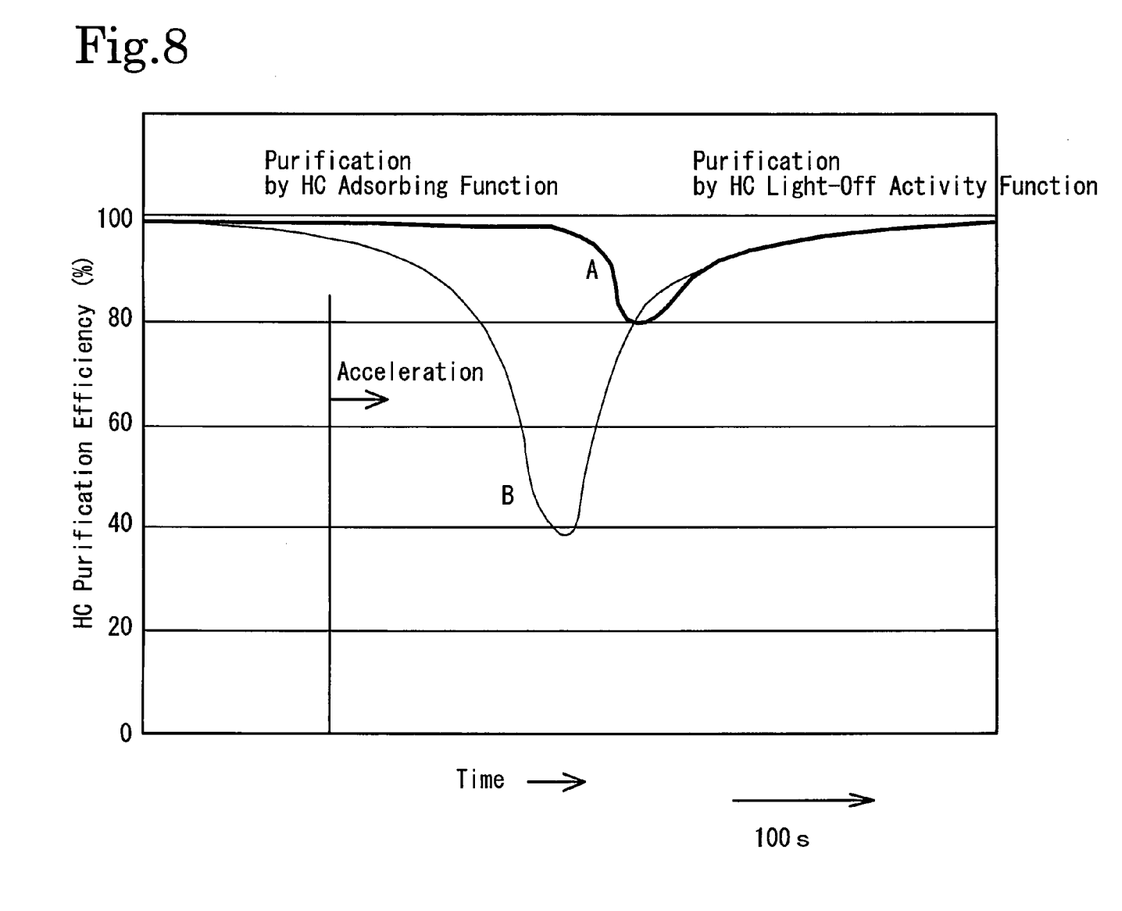
FIG. 8 is a view showing HC purification efficiencies in an Example and a Conventional Example.

Next, experimental results in the first embodiment are shown in FIG. 6 to FIG. 8. In this first embodiment, the oxidation catalyst 2 has an HC oxidizing function, and is located on the upstream side of the NOx storage reduction catalyst 3. Accordingly, the amount of HCs flowing out is determined by the relationship between the oxidation catalyst 2 and the HC adsorption material 4. As shown in FIG. 6, there is a difference in the temperatures of the oxidation catalyst 2 and the HC adsorption material 4 during acceleration. When the temperature of the HC adsorption material 4 rises to 250° C., and thereby HCs are released, the oxidation catalyst 2 has been heated to 230° C. or above, and therefore a sufficient level of the HC light-off activity can be expected. Thus, the temperature range in which the outflow of HCs is worsened can be eliminated. As a result, as shown in FIG. 7, Example A in which the exhaust gas purification apparatus 1 of the first embodiment is used has a significantly reduced concentration of the HC flowing out compared to that of Conventional Example B in which no HC adsorption material is used. Further, the same result is shown in terms of the HC purification efficiency as shown in FIG. 8. It is observed that, in Example A, purification by the HC adsorbing function is performed in the first half of the acceleration, and purification by the HC light-off activity function by the oxidation catalyst is performed in the latter half. On the other hand, in Conventional Example B, no purification by the HC adsorbing function is performed in the first half; therefore, the HC purification efficiency is smaller.

Thus, according to the exhaust gas purification apparatuses 1, 1A, 1B, and 1C having the above-described constitutions, even in an engine operating state during acceleration, the exhaust gas flowing into the second exhaust gas treatment members 4 and 4A having the HC adsorbing function located on the downstream side can be cooled efficiently during the period until the temperature of the first exhaust gas treatment member 3, such as a three-way catalyst and a NOx storage reduction catalyst, located on the upstream side rises to the HC light-off temperature; therefore, HCs can be adsorbed by the second exhaust gas treatment members 4 and 4A. Further, the heat insulating structure also forms a container and thereby lowers the outside temperature; thus, both cost efficiency and safety can be achieved.

As a result, in the prior art, especially during acceleration, it is not necessary to carry out such control, including control to prevent an excessively rich atmosphere by reducing fuel in the case of a three-way catalyst, and control to attempt to prevent HC from flowing out into the atmosphere by stopping rich reduction or the like during the period until the catalyst temperature rises to improve the HC purification efficiency at the expense of the NOx purification efficiency in the case of a NOx storage reduction catalyst. For this reason, a sufficient level of NOx reduction in NOx regeneration control for the purpose of restoring the NOx storage capacity can be carried out from the early stage of acceleration. Thus, the NOx purification efficiency can be improved.

The exhaust gas purification apparatus of the present invention which has excellent effects described above can be disposed in internal combustion engines and the like mounted in vehicles, and can be used extremely effectively in an exhaust gas purification apparatus including a catalyzer, such as a three-way catalyst and a NOx purification catalyst.

What is claimed is:
1. An exhaust gas purification apparatus, comprising
a first exhaust gas treatment member supporting at least one of an oxidation catalyst, a three-way catalyst, or a NOx storage reduction catalyst, which is used for purifying exhaust gas from an internal combustion engine;
a second exhaust gas treatment member having a hydrocarbon storing function, the second exhaust gas treat- ment member being disposed on a downstream side of the first exhaust gas treatment member;
a connecting passage located between the first exhaust gas treatment member and the second exhaust gas treatment member,
wherein said connecting passage causes the exhaust gas entering an upstream side of said connecting passage to move in a same direction into the second exhaust gas treatment member that is different than a direction of the exhaust gas flowing from an upstream side to the downstream side of said first exhaust gas treatment member; and
a heat dissipating unit between the first exhaust gas treatment member and the second exhaust gas treatment member,
wherein the heat dissipating unit lowers a temperature of the exhaust gas flowing into the second exhaust gas treatment member,
wherein an upstream side of the heat dissipating unit is a heat insulating structure, and
wherein a further upstream side of the heat dissipating unit a heat retaining structure.

2. The exhaust gas purification apparatus according to claim 1, wherein
the first exhaust gas treatment member and the second exhaust gas treatment member are respectively arranged on both sides of the heat dissipating unit in such a way to be parallel to each other with the heat dissipating unit as a bottom part so as to arrange a whole shape of the first exhaust gas treatment member, the heat dissipation unit, and the second exhaust gas treatment member in a U-letter shape.

3. The exhaust gas purification apparatus according to claim 1, wherein
the first exhaust gas treatment member and the second exhaust gas treatment member are arranged in parallel to each other, and the connecting passage is a winding connecting passage provided therebetween so as to form a whole shape of the first exhaust gas treatment member, the connecting passage, and the second exhaust gas treatment member into an S-letter shape, and
at least a portion of the connecting passage is the heat dissipating unit.

4. The exhaust gas purification apparatus according to claim 1, wherein
the first exhaust gas treatment member and the second exhaust gas treatment member are arranged in any one of a T-letter shape and an L-letter shape, and the connecting passage is a winding connecting passage provided therebetween so as to form a whole shape of the first exhaust gas treatment member, the connecting passage, and the second exhaust gas treatment member into any one of a T-letter shape and an L-letter shape, and
at least a portion of the connecting passage is the heat dissipating unit.

5. An exhaust gas purification apparatus, comprising:
a first exhaust gas treatment member supporting any one of an oxidation catalyst, a three-way catalyst, or a NOx storage reduction catalyst, which is used for purifying exhaust gas from an internal combustion engine;
a second exhaust gas treatment member having a hydrocarbon storing function, the second exhaust gas treatment member being disposed on a downstream side of the first exhaust gas treatment member; and
a heat dissipating unit between the first exhaust gas treatment member and the second exhaust gas treatment member,
wherein the heat dissipating unit lowers a temperature of the exhaust gas flowing into the second exhaust gas treatment member,
wherein an upstream side of the heat dissipating unit is a heat insulating structure,
wherein a further upstream side of the heat dissipating unit is a heat retaining structure, and
wherein the first exhaust gas treatment member and the second exhaust gas treatment member are respectively arranged on both sides of the heat dissipating unit in such a way to be parallel to each other with the heat dissipating unit as a bottom part so as to arrange a whole shape of the first exhaust gas treatment member, the heat dissipation unit, and the second exhaust gas treatment member in a U-letter shape.

6. An exhaust gas purification apparatus, comprising:
a first exhaust gas treatment member supporting any one of an oxidation catalyst, a three-way catalyst, or a NOx storage reduction catalyst, which is used for purifying exhaust gas from an internal combustion engine;
a second exhaust gas treatment member having a hydrocarbon storing function, the second exhaust gas treatment member being disposed on a downstream side of the first exhaust gas treatment member; and
a heat dissipating unit between the first exhaust gas treatment member and the second exhaust gas treatment member,
wherein the heat dissipating unit lowers a temperature of the exhaust gas flowing into the second exhaust gas treatment member,
wherein an upstream side of the heat dissipating unit is a heat insulating structure, and
wherein a further upstream side of the heat dissipating unit is a heat retaining structure, and
wherein the first exhaust gas treatment member and the second exhaust gas treatment member are arranged in parallel to each other, and a winding connecting passage is provided therebetween so as to form a whole shape of the first exhaust gas treatment member, the connecting passage, and the second exhaust gas treatment member into an S-letter shape, and any one of a part or a whole of the connecting passage is the heat dissipating unit.

7. An exhaust gas purification apparatus, comprising:
a first exhaust gas treatment member supporting any one of an oxidation catalyst, a three-way catalyst, or a NOx storage reduction catalyst, which is used for purifying exhaust gas from an internal combustion engine;
a second exhaust gas treatment member having a hydrocarbon storing function, the second exhaust gas treatment member being disposed on a downstream side of the first exhaust gas treatment member; and
a heat dissipating unit disposed between the first exhaust gas treatment member and the second exhaust gas treatment member,
wherein the heat dissipating unit lowers a temperature of exhaust gas flowing into the second exhaust gas treatment member,
wherein an upstream side of the heat dissipating unit is a heat insulating structure,
wherein a further upstream side of the heat dissipating unit is formed into a heat retaining structure, and
wherein the first exhaust gas treatment member and the second exhaust gas treatment member are arranged in any one of a T-letter shape and an L-letter shape, and a winding connecting passage is provided therebetween so as to form a whole shape of the first exhaust gas treatment member, the connecting passage, and the second exhaust gas treatment member into any one of a T-letter shape and an L-letter shape, and any one of a part or a whole of the connecting passage is the heat dissipating unit.

* * * * *